United States Patent [19]

James et al.

[11] Patent Number: 5,427,900

[45] Date of Patent: Jun. 27, 1995

[54] PHOTOGRAPHIC ELEMENT HAVING A TRANSPARENT MAGNETIC RECORDING LAYER

[75] Inventors: Robert O. James, Rochester; Lawrence A. Rowley, Macedon; Joseph A. Verdone, Rochester, all of N.Y.

[73] Assignee: Eastman Kodak Company, Rochester, N.Y.

[21] Appl. No.: 193,304

[22] Filed: Feb. 8, 1994

Related U.S. Application Data

[63] Continuation-in-part of Ser. No. 171,785, Dec. 22, 1993, abandoned.

[51] Int. Cl.$^6$ .................... G03C 1/76; G11B 5/708
[52] U.S. Cl. ..................... 430/496; 430/140; 430/501; 430/523; 428/694 B; 428/694 BG; 428/694 BU; 428/694 BY; 428/694 BS; 428/694 BR; 428/694 BN; 428/694 BA
[58] Field of Search ............... 430/140, 496, 501, 523; 428/694 B, 694 BG, 694 BU, 694 BY, 694 BS, 694 BR, 694 BN, 694 BA

[56] References Cited

U.S. PATENT DOCUMENTS

| | | |
|---|---|---|
| 3,782,947 | 1/1974 | Krall ..................... 430/495 |
| 4,279,945 | 7/1981 | Audran et al. ................ 430/140 |
| 4,394,441 | 7/1983 | Kawaguchi et al. . |
| 4,418,141 | 11/1983 | Kawaguchi et al. ............... 430/527 |
| 4,431,764 | 2/1984 | Yoshizumi . |
| 4,495,276 | 1/1985 | Takimoto et al. ............... 430/527 |
| 4,528,240 | 7/1985 | Miyoshi et al. ............... 428/694 BS |
| 4,990,276 | 2/1991 | Bishop et al. ............... 430/523 |
| 4,999,276 | 3/1991 | Kuwabara et al. . |
| 5,147,768 | 9/1992 | Sakakibara ............... 430/501 |
| 5,217,804 | 6/1993 | James et al. ............... 428/694 BA |
| 5,229,259 | 7/1993 | Yokota ............... 430/523 |
| 5,252,441 | 10/1993 | James et al. ............... 430/140 |
| 5,294,525 | 3/1994 | Yamauchi et al. ............... 430/501 |

*Primary Examiner*—Charles L. Bowers, Jr.
*Assistant Examiner*—Mark F. Huff
*Attorney, Agent, or Firm*—Robert A. Gerlach

[57] ABSTRACT

A photographic element comprising a support having provided thereon a light-sensitive layer and a transparent magnetic recording layer, the magnetic recording layer comprising a transparent polymeric binder, ferromagnetic particles and tin oxide particles, the magnetic particles having a surface area greater than 30 m$^2$/gm and a coverage of from about $1 \times 10^{-11}$ mg/$\mu$m$^3$ to about $1 \times 10^{-10}$ mg/$\mu$m$^3$, the tin oxide particles having a median diameter of less than 0.15 $\mu$m and being present in the transparent magnetic layer in an amount of from 300 to 1200 percent by weight based on the weight of the binder.

45 Claims, No Drawings

PHOTOGRAPHIC ELEMENT HAVING A TRANSPARENT MAGNETIC RECORDING LAYER

This is a continuation-in-part of U.S. Ser. No. 08/171,785 filed Dec. 22, 1993, now abandoned

BACKGROUND OF THE INVENTION

1. FIELD OF THE INVENTION

This invention relates to photographic elements and more particularly to photographic elements having a light-sensitive silver halide layer and a transparent magnetic recording layer.

2. DESCRIPTION OF RELATED ART

It is known from various U.S. patents, including: U.S. Pat. Nos. 3,782,947; 4,279,945; 4,990,276; 5,217,804; 5,147,768; 5,229,259, and others; to include in a light-sensitive silver halide photographic element a transparent magnetic recording layer. Such elements are advantageous because they can be employed to record images by the customary photographic process while at the same time information can be recorded into and read from the magnetic recording layer by the techniques similar to that employed in the magnetic recording art.

A difficulty, however, arises in that magnetic recording layers generally employed in the magnetic recording industry are opaque, not only because of the nature of the magnetic particles, but also because of the requirements that the recording layer contains other additives which further create problems with regard to the optical characteristics of the layer. Also, the requirements of recording and reading of the magnetic signal from a transparent magnetic layer present on a photographic element are more stringent than that found in conventional magnetic recording because of the loading of the magnetic particles in the transparent magnetic layer and the nature of the photographic element.

Thus, the presence of the magnetic recording layer cannot interfere with the primary function of the photographic element which is to achieve realistic reproductions of the original image. In addition, the magnetic recording layer must be capable of accurately recording the information applied thereto and reading out the information on demand. This is particularly difficult because the loading of the magnetic particles in the transparent layer must be such as to not interfere with the quality of the photographic elements.

Finally, the photographic element and particularly the transparent magnetic recording layer provided thereon must be capable of repeated use in both the recording and reading mode and, therefore, must have improved running, durability, head cleaning properties and not adversely affect the quality of the photographic element. For example, during the residence of the film in a camera, entries may be made to the magnetic recording layer for every exposure, and an indeterminate number of read operations are conducted depending on the particular application to which the film is used. This also is true in the processing of the film and in subsequent use of the processed film for additional copies, enlargements and the like.

It can, therefore, be readily seen that it would be highly desirable to provide photographic elements having a transparent magnetic recording layer exhibiting improved magnetic and photographic performance as well as improved running durability and head cleaning properties. This goal is extremely difficult to achieve because of the nature and concentration of the magnetic particles required to provide sufficient signal to write and read magnetically stored data, the effect of any noticeable color, haze, or grain associated with the magnetic layer on the photographic layers and the effect of the magnetic layer on the optical density and granularity of the photographic layers. Thus, all of these various characteristics must be considered both independently and cumulatively in order to arrive at a commercially viable photographic element containing a transparent magnetic recording layer that will withstand repeated and numerous passages through the recording and reading zones of a suitable apparatus. Also, because of the curl of the element, primarily due to the photographic layers and core set, the film must be held tightly against the magnetic heads by pressures much higher than those in conventional magnetic recording in order to maintain film plane flatness in the recording and reading zone.

SUMMARY OF THE INVENTION

The invention provides an improved photographic element including a support, having provided thereon a light-sensitive layer and a transparent magnetic recording layer, the magnetic recording layer comprising a transparent polymeric binder, ferro-magnetic particles and tin oxide particles, the magnetic particles having a surface area greater than 30 $m^2$/gm and a coverage of from about $1 \times 10^{-11}$ mg/$\mu m^3$ to about $1 \times 10^{-10}$ mg/$\mu m^3$, ($\mu m = 10^{-6}$ meter) tin oxide particles having a surface area of 15 to 100 $m^2$/gm, a median diameter on a weight basis of less than 0.15 $\mu m$, preferably less than 0.1 $\mu m$ and most preferably from 0.05 to 0.1$\mu m$, the tin oxide particles being present in the magnetic layer in an amount of from 300 to 1200 percent by weight based on the weight of the binder. Because of the requirement that the magnetic layer be transparent in the photographic sense, it was highly unexpected to find that the addition of further particulate material to the magnetic recording layer could be achieved without interfering with the photographic properties of the element while at the same time achieving substantial increase in head cleaning and running durability.

DETAILED DESCRIPTION OF THE INVENTION

In the preparation of a photographic element having a transparent magnetic recording layer, the magnetic particles have a surface area greater than 30 $m^2$/gm and preferably greater than 40 $m^2$/gm. The coverage of the magnetic particles in the magnetic recording layer varies within the ranges given above depending upon the thickness of the magnetic recording layer. For optimum performance, the magnetic recording layer should be such that normal wear will not result in signal loss after multiple reading and writing operations. However, the layer must not be so thick as to interfere with the photographic properties of the film.

In accordance with this invention, the tin oxide particles are present in the magnetic recording layer in an amount of from about 300 percent to about 1200 percent by weight based on the weight of the binder present. Tin oxide particles in any form may be employed such as tin oxide per se or doped tin oxides, such as, antimony or indium doped tin oxide. The tin oxide may be used in either the conductive or non-conductive form; however, when in the conductive form, an additional advantage is gained in that when the tin oxide particles are present in an amount of 1000 to 1200 percent by weight based on the weight of the binder, the layer also acts as an antistat. Suitable conductive particles are disclosed in U.S. Pat. Nos. 4,495,276; 4,394,441; 4,431,764; 4,418,141 and 4,999,276 incorporated herein by reference. Useful tin oxide particles are commercially available from Keeling and Walker, Ltd. under the trade designation Stanostat CPM 375; DuPont Co. under the trade designation Zelec-ECP 3005XC and 3010SC and Mitsubishi Metals Corp. under the trade designation T-1.

The magnetic particles are present in the magnetic recording layer in an amount of from about 2.7 to about 10 percent by weight based upon the weight of the binder.

In accordance with this invention, the transparent magnetic layer is prepared by initially forming a high solids content magnetic concentrate by mixing the magnetic particles in a suitable grind solvent together with suitable surfactants and milling in a device such as, for example, a ball mill, a roll mill, a high speed impeller mill, media mill, an attritor or a sand mill. Milling proceeds for a sufficient time to ensure that substantially no agglomerates of the magnetic particles remain. The high solids magnetic concentrate is next diluted with suitable solvents and polymeric stabilizers to maintain the particles in an unagglomerated state (subsequently referred to as the intermediate letdown). Mixing for an additional period of time is continued in order to polish the ingredients.

In a separate container, the binder polymer is dissolved in a suitable solvent. To this solution is added the intermediate letdown in accordance with the procedure set forth above and stirring is continued. A dispersion of the tin oxide particles is prepared by milling to break up agglomerates of the abrasive particles and this is added to the mixer containing the binder solution and intermediate letdown. This dispersion may be coated onto a suitable support in its present form or additional and optional ingredients such as, crosslinking agents, catalysts, coating aids, lubricants and the like, may be added before the coating operation.

The coating composition is applied to a suitable support which may contain additional layers for promoting adhesion, by any suitable coating device including slot die hoppers, slide hoppers, gravure coaters, reverse roll coaters and the like.

The magnetic layer can also be overcoated with conventional layers including antistats, protective overcoats, lubricants and the like.

Any suitable support may be employed in the practice of this invention, such as, cellulose derivatives including cellulose diacetate, cellulose triacetate, cellulose propionate, cellulose butyrate, cellulose acetate-propionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethylpentene, polysulfone, polyethersulfone, polyarylates, polyether imides and the like. Particularly preferred supports are polyethylene terephthalate, polyethylene naphthalate and the cellulose esters particularly cellulose triacetate.

Thickness of those supports used in the present invention is from 50 $\mu$m to 180 $\mu$m, preferably, 85 to 125 microns. In addition, various dyes may be formulated into the support or the magnetic layer to give neutral density.

Depending upon the nature of the support, suitable transparent tie or undercoat layers may be desired. Particularly with regard to polyester supports, primers are used in order to promote adhesion. Any suitable primers in accordance with those described in the following U.S. patents maybe employed: U S. Pat. Nos. 2,627,088; 3,501,301; 4,689,359; 4,363,872; and 4,098,952. Each of these are incorporated herein by reference in their entirety.

The ferromagnetic pigments comprise ferromagnetic iron oxides, such as $\gamma$-Fe$_2$O$_3$, Fe$_3$O$_4$ or $\gamma$-Fe$_2$O$_3$ or Fe$_3$O$_4$ with Co, Zn or other metals in solid solution or surface treated, or ferromagnetic chromium dioxides, such as CrO$_2$ or CrO$_2$ with metallic elements, for example Li, Na, Sn, Pb, Fe, Co, Ni and Zn, or halogen atoms in solid solution. Ferromagnetic metal pigments with an oxide coating on their surface to improve their chemical stability or to improve dispersibility, as is commonly used in conventional magnetic recording, may also be used in accordance with the invention. In addition, magnetic oxides with a thicker layer of lower refractive index oxide or other material having a lower optical scattering cross-section as taught in U.S. Pat. Nos. 5,217,804 and 5,252,444 may also be used. Cobalt surface treated iron oxide is the preferred ferromagnetic material for use in accordance with this invention.

The binders used in the magnetic layer include, for example, vinyl chloride-vinyl acetate copolymers, vinyl chloride-vinyl acetate-vinyl alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene, chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyral, polyvinyl acetal, cellulose derivatives, styrene-butadiene copolymers, polyester resins, phenolic resins, epoxy resins, thermosetting polyurethane resins, urea resins, melamine resins, alkyl resins, urea-formaldehyde resins and the like. Of the above, the cellulose derivatives are the preferred binders for use in accordance with this invention. Cellulose derivatives include cellulose esters such as, for example, cellulose acetate, cellulose diacetate, cellulose triacetate, cellulose acetate butyrate, cellulose acetate propionate, and the like. The most preferred binder is cellulose diacetate. For crosslinking of the binder with isocyanates, the binder should contain active hydrogen atoms as determined by the Zerewitinoff test, such active hydrogen atoms including —OH, —NH$_2$ —NHR, where R is an organic radical, and the like, as described in U.S. Pat. No. 3,479,310.

A dispersing agent, sometimes referred to as a wetting agent or a surface active agent, can be present in the dispersion to facilitate dispersion of the magnetic particles and/or wetting of the particles with the dispersing medium. This helps to further minimize agglomeration of the magnetic particles. The dispersing agent can be present in the dispersion in an amount up to about 0.02%, preferably 0.001 to 0.01%, by weight. Useful dispersing agents include fatty acid amines, and commercially available wetting agents such as Witco Emcol CC59 which is a quaternary amine available from Witco Chemical Corp. Rhodafac PE 510, Rhodafac RE 610, Rhodafac RE 960, and Rhodafac LO 529 which are phosphoric acid esters available from Rhone-Poulenc. Other constituents of the coating composition including grind solvents, coating aids, and solvents for the binder are included. Suitable grind solvents include, for example, an ester of an acid such as phthalic acid. Preferred esters are dialkylesters of phthalic acid, the alkyl portion of which can contain from 1 to about 12, preferably 4 to 8, carbon atoms. Exemplary useful esters include dimethyl phthalate, diethyl phthalate, dioctyl phthalate, dipropyl phthalate, and dibutyl phthalate as disclosed in U.S. Pat. No. 4,990,276 issued to Bishop et al. and assigned to the same assignee as this application.

Suitable coating aids include nonionic fluorinated alkyl esters such as, FC-430, FC-431 sold by Minnesota Mining and Manufacturing Co., polysiloxanes such as, Dow Corning DC 1248, DC 200, DC 510, DC 190 sold by Dow Corning and BYK 310, BYK 320, and BYK 322 sold by BYK Chemie and SF 1079, SF 1023, SF 1054 and SF 1080 sold by General Electric.

Organic solvents are normally used for the preparation of the dispersion. Examples of suitable solvents are ketones, such as acetone, methyl ethyl ketone and cyclohexanone, alcohols, esters, such as ethyl acetate and butyl acetate, cellosolves, ethers, such as tetrahydrofuran aromatic solvents, such as toluene, and chlorinated hydrocarbons as solvents, such as carbon tetrachloride, chloroform, dichloromethane; tetrahydrofuran and the ketoesters of U.S. Ser. No. 08/173,833 filed Dec. 22, 1993, entitled *Coating Compositions For A Transparent Magnetic Recording Layer*, by R. M. Wexler and assigned to the same assignee as the immediate application, which are preferred.

Optionally, the binder in the magnetic layer may be crosslinked employing any suitable crosslinking agent such as, for example, organic isocyanates; aziridines, as taught in U.S. Pat. No. 4,225,665; and melamines such as methoxymethylmelamine, and the like as set forth in U.S. Pat. No. 5,198,499 to Anderson et al. issued Mar. 30, 1993 and assigned to the same assignee as this application.

Any suitable organic polyisocyanate can be used as the crosslinking agent such as, tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyctohexylene diisocyanate, lysine diisocyanate, tolylene diisocyanate, diphenylmethane diisocyanate, polymers of the foregoing, polyisocyanates prepared by reacting an excess of an organic diisocyanate with an active hydrogen containing compounds such as polyols, polyethers and polyesters and the like including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, including biuret compounds, allophanate compounds and the like. The preferred polyisocyanates employed as a crosslinking agent is the reaction product of trimethylol propane and 2,4-tolylene diisocyanate sold by Mobay under the trade designation Mondur CB 75.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Additional useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granutarities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less than about 1 micron. Particle concentrations less than about 10 mg/m$^2$ tend to be insufficient for magnetic recording purposes and particle concentrations greater than about 1000 mg/m$^2$ tend to be too dense for photographic purposes. Particularly useful particle concentrations are in the range of 20–70 mg/m$^2$. Concentrations of about 20 mg/m$^2$ have been found to be particularly useful in reversal films and concentrations of about 40 mg/m$^2$ are particularly useful in negative films.

The photographic elements according to this invention can contain one or more conducting layers such as antistatic layers and/or anti-halation layers such as such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide and vanadium pentoxide.

The photographic elements according to this invention can be provided with a protective or lubricating layer, such as a wax layer, on or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred.

The invention will be further illustrated by the following examples in which parts and percentages are given by weight unless otherwise specified.

EXAMPLES

Example 1

A cellulose diacetate binder with magnetic particles and antimony doped tin oxide particles is cast to a thickness of about 0.2 micrometer onto subbed polyethylene terephthalate with a 0.75 micrometer cellulose triacetate overcoat from a dispersion composition as shown in Table 1. This dispersion is prepared by adding a dispersion of the magnetic particle, stabilized with Gafac PE 510 and cellulose diacetate, in methylene chloride and methanol to a cellulose diacetate solution in methylene chloride/acetone/methyl acetoacetate using a high shear mixer. A dispersion of the tin oxide particles in methylene chloride and methanol is then added using a high shear mixer. Subsequently, the cast magnetic layer is overcoated with 3.1 mg/sq.ft. of pentaerythrityl tetrastearate.

TABLE 1

| Dispersion Ingredient | Function | Weight Percent |
|---|---|---|
| Cellulose Diacetate | Binder | 0.5 |
| Toda CSF-4085V2 | Magnetic Particle | 0.25 |
| Gafac PE510 | Surfactant | 0.008 |
| Antimony doped Tin Oxide* | Filler/Abrasive | 5.5 |
| Methylene chloride | Solvent | 74.994 |
| Methanol | Solvent | 18.748 |

*Keeling and Walker CPM375

EXAMPLE 2

A cellulose triacetate binder with magnetic particles and antimony doped tin oxide particles is cast to a thickness of about 0.2 micrometer onto subbed polyethylene terephthalate with a 0.75 micrometer cellulose triacetate overcoat from a dispersion composition as shown in Table 2. The dispersion is prepared as in Example 1 except that cellulose triacetate is used in place of cellulose diacetate and butanol replaces methanol. Subsequently, the cast magnetic layer is overcoated with 3.1 mg/sq. ft. of pentaerythrityl tetrastearate.

TABLE 2

| Dispersion Ingredient | Function | Weight Percent |
|---|---|---|
| Cellulose Diacetate | Binder | 0.5 |
| Toda CSF-4085V2 | Magnetic Particle | 0.25 |
| Gafac PE510 | Surfactant | 0.008 |
| Antimony doped Tin Oxide* | Filler/Abrasive | 5.5 |
| Methylene chloride | Solvent | 74.994 |
| Butanol | Solvent | 18.748 |

*Keeling and Walker CPM375

Comparative Example C-1

A cellulose diacetate/cellulose triacetate binder with magnetic particles and abrasive particles is cast to a thickness of about 1.2 microns onto subbed polyethylene terephthalate from a dispersion composition as shown in Table 5. The dispersion is prepared as in Example 1 except that the abrasive particle is omitted.

TABLE 3

| Dispersion Ingredient | Function | Percent |
|---|---|---|
| Cellulose Diacetate | Binder | 2.565 |
| Cellulose Triacetate | Binder/Dispersion Stabilizer | 0.118 |
| Toda CSF-4085V2 | Magnetic Particle | 0.118 |
| Rhodafac PE510 | Surfactant | 0.006 |
| Dibutyl Phthalate | Grind Solvent | 0.138 |
| 3M FC-431 | Coating Aid | 0.015 |
| Methylene chloride | Solvent | 67.926 |
| Acetone | Solvent | 24.26 |
| Methyl acetoacetate | Solvent | 4.854 |

EVALUATION METHODS

Rotating Drum Friction Test

The running durability of the lubricated cast layers was evaluated using a Steinberg Rotating Drum Friction Tester. The initial (breakaway) friction coefficient and final (running) friction coefficient are measured under 50 gram load and drum speed of 30 cm/sec at 23° C. and 50% relative humidity. The running friction is measured after 10 minutes. The Rotating Drum Friction Test is sensitive to surface lubrication.

Surface Electrode Resistivity

Sample resistivity is measured by inserting a 10 cm by 10 cm sample into a Hewlett-Packard resistivity cell, Model 16008A, charging the sample, and measuring the resistance with a Hewlett-Packard High Resistance Meter, Model 4329A.

Head Clogging Test

Head clogging of the lubricated cast layers is evaluated using a Honeywell 7600 reel-to-reel transport operating at a tape speed of 3.75 inches per second and a tape tension of 13 ounces. Output signal characterization is performed using a Tektronix 7854 digitizing oscilloscope. Head clogging is determined to have occurred if the peak-to-peak output voltage decreased along the length of tape tested.

Haze Measurement

The haze of lubricated cast layers is evaluated with an XL-211 Hazegard System by measuring transmitted light on a percentage basis for any light deviating by more than 2.5° C. from the incident beam.

TABLE 4

| Example | Haze | Rotating Drum Friction Initial | Rotating Drum Friction Final | Surface Electrode Resistivity (ohms/square) | Head Clogging |
|---------|------|---------|-------|------------------|----------|
| Example 1 | 7.0 | 0.26 | 0.11 | $7.37 \times 10^{11}$ | No |
| Example 2 | 12.1 | 0.26 | 0.08 | $2.18 \times 10^{11}$ | No |
| C-1 | 6.5 | 0.23 | 0.07 | $>10^{15}$ | Yes |

Examples 3 and 4 and Comparative Example C-1

A color photographic recording material for color negative development is prepared by applying the following layers in the given sequence to the opposite side of each of the supports of Examples 1 and 2 and Comparative Example 1 respectively. The quantities of silver halide are given in grams (g) of silver per m². The quantities of other materials are given in g per m².

Layer 1 {Antihalation Layer} black colloidal silver sol containing 0.236 g of silver, with 2.44 g gelatin.

Layer 2 {First (least) Red-Sensitive Layer} Red sensitized silver iodobromide emulsion [1.3 mol % iodide, average grain diameter 0.55 microns, average thickness 0.08 microns] at 0.49 g, red sensitized silver iodobromide emulsion [4 mol % iodide, average grain diameter 1.0 microns, average thickness 0.09 microns] at 0.48 g, cyan dye-forming image coupler C-1 at 0.56 g, cyan dye-forming masking coupler CM-1 at 0.033 g, BAR compound B-1 at 0.039 g, with gelatin at 1.83 g.

Layer 3 {Second (more) Red-Sensitive Layer} Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dyeforming masking coupler CM-1 at 0.022 g, DIR compound D-1 at 0.011 g, with gelatin at 1.66 g.

Layer 4 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.13 g, cyan dye-forming masking coupler CM-1 at 0.033 g, DIR compound D-1 at 0.024 g, DIR compound D-2 at 0.050 g, with gelatin at 1.36 g.

Layer 5 {Interlayer} Yellow dye material YD-1 at 0.11 g and 1.33 g of gelatin

Layer 6 {First (least) Green-Sensitive Layer} Green sensitized silver iodobromide emulsion [1.3 mol % iodide, average grain diameter 0.55 microns, average grain thickness 0.08 microns] at 0.62 g, green sensitized silver iodobromide emulsion [4 mol % iodide, average grain diameter 1.0 microns, average grain thickness 0.09 microns] at 0.32 g, magenta dye-forming image coupler M-1 at 0.24 g, magenta dye-forming masking coupler MM-1 at 0.067 g with gelatin at 1.78 g.

Layer 7 {Second (more) Green-Sensitive Layer} Green sensitized silver iodobromide emulsion [4 mol % iodide, average grain diameter 1.25 microns, average grain thickness 0.12 microns] at 1.00 g, magenta dye-forming image coupler M-1 at 0.091 g, magenta dye-forming masking coupler MM-1 at 0.067 g, DIR compound D-1 at 0.024 g with gelatin at 1.48 g.

Layer 8 {Third (most) Green-Sensitive Layer} Green sensitized silver iodobromide emulsion [4 mol % iodide, average grain diameter 2.16 microns, average grain thickness 0.12 microns] at 1.00 g, magenta dye-forming image coupler M-1 at 0.0.72 g, magenta dye-forming masking coupler MM-1 at 0.056 g, DIR compound D-3 at 0.01 g, DIR compound D-4 at 0.011 g, with gelatin at 1.33 g.

Layer 9 {Interlayer} Yellow dye material YD-2 at 0.11 g with 1.33 g gelatin.

Layer 10 {First (less) Blue-Sensitive Layer} Blue sensitized silver iodobromide emulsion [1.3 mol % iodide, average grain diameter 0.55, average grain thickness 0.08 microns] at 0.24 g, blue sensitized silver iodobromide emulsion [6 mol % iodide, average grain diameter 1.0 microns, average grain thickness 0.26 microns] at 0.61 g, yellow dye-forming image coupler Y-1 at 0.29 g, yellow dye forming image coupler Y-2 at 0.72 g, cyan dye-forming image coupler C-1 at 0.017 g, DIR compound D-5 at 0.067 g, BAR compound B-1 at 0.003 g with gelatin at 2.6 g.

Layer 11 {Second (more) Blue-Sensitive Layer} Blue sensitized silver iodobromide emulsion [4 mol % iodide, average grain diameter 3.0 microns, average grain thickness 0.14 microns] at 0.23 g, blue sensitized silver iodobromide emulsion [9 mol % iodide, average grain diameter 1.0 microns] at 0.59 g, yellow dye-forming image coupler Y-1 at 0.090 g, yellow dye-forming image coupler Y-2 at 0.23 g, cyan dye-forming image coupler C-1 0.022 g, DIR compound D-5 at 0.05 g, BAR compound B-1 at 0.006 g with gelatin at 1.97 g.

Layer 12 {Protective Layer} 0.111 g of dye UV1, 0.111 g of dye UV-2, unsensitized silver bromide Lippman emulsion at 0.222 g, 2.03 g.

This film is hardened at coating with 2% by weight to total gelatin of hardener H-1. Surfactants, coating aids, scavengers, soluble absorber dyes and stabilizers are added to the various layers of this sample as is commonly practiced in the art.

The formulas for the component materials are as follows:

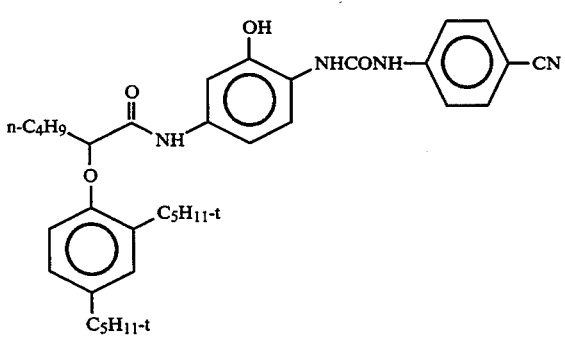

-continued
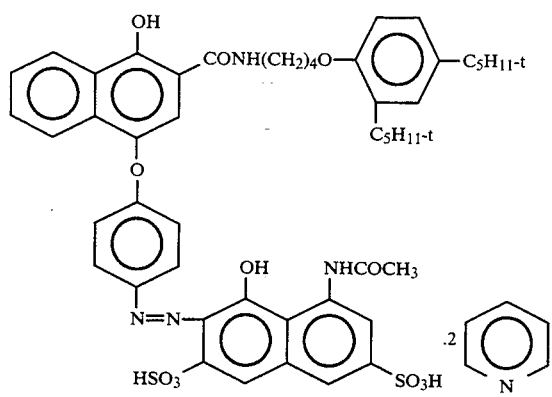
CM-1
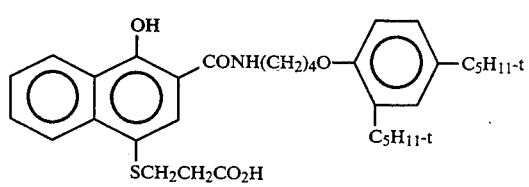
B-1
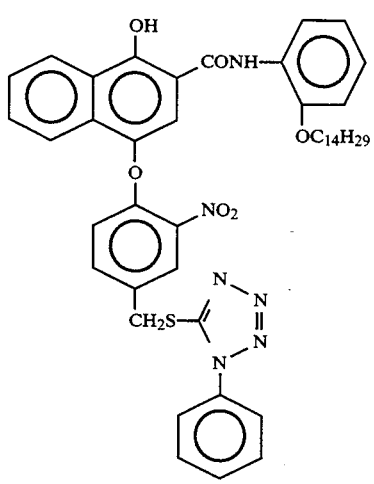
D-1:
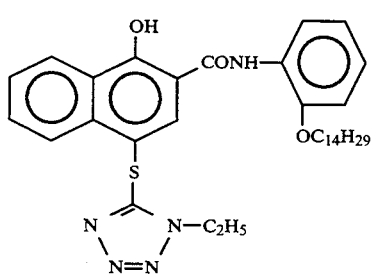
D-2
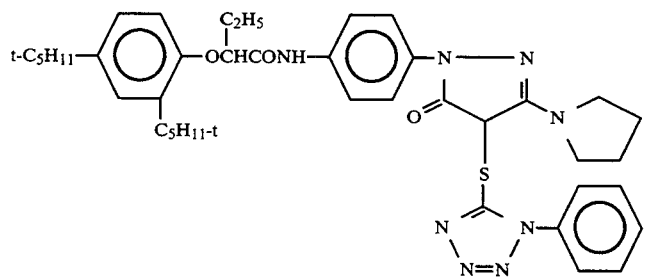
D-3:

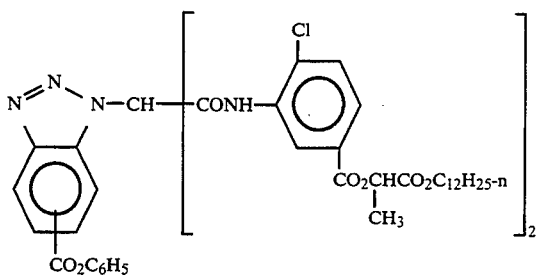
D-4
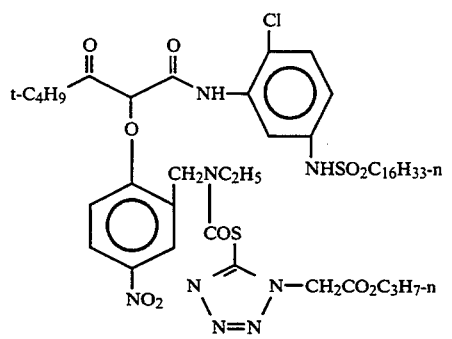
D-5:
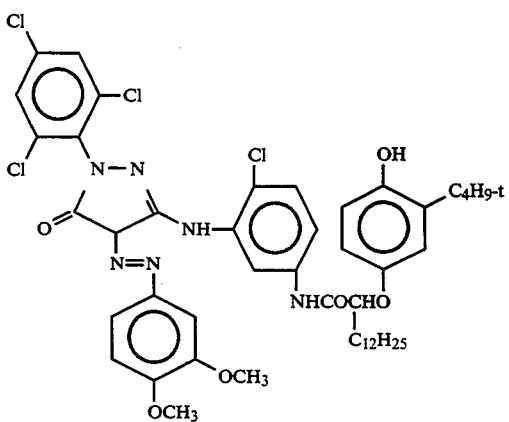
MM-1
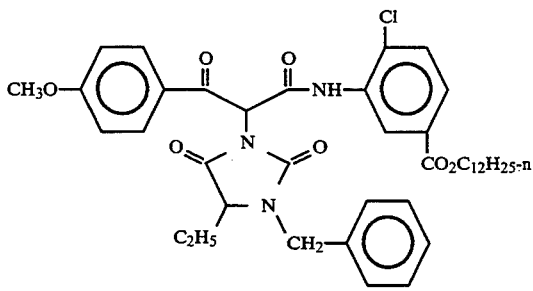
Y-1:
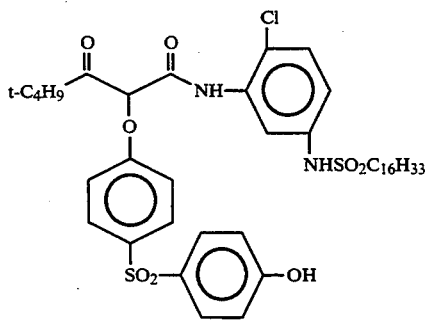
Y-2

-continued

M-1:

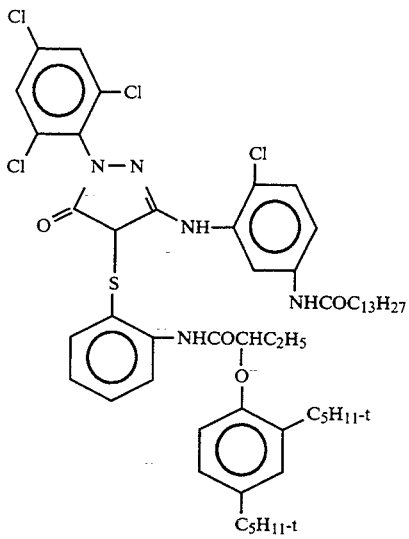

YD-1:

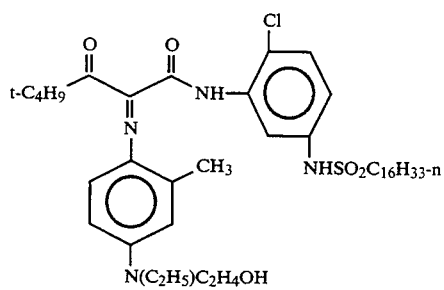

YD-2:

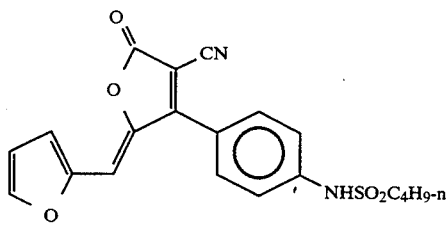

UV-1:

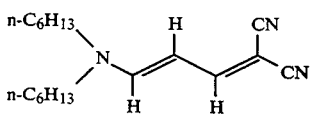

UV-2:

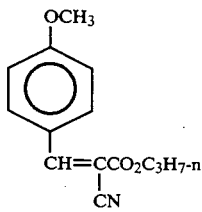

H-1:

The quantity of the tin oxide particles, even at the highest levels do not interfere significantly with the optical qualities of the photographic element.

The invention has been described in detail with particular reference to preferred embodiments thereof, but it will be understood that variations and modifications can be effected within the spirit and scope of the invention.

What is claimed is:

1. A photographic element comprising a support having provided thereon a light-sensitive layer and a transparent magnetic recording layer, the magnetic recording layer comprising a transparent polymeric binder, ferro-magnetic particles and tin oxide particles, the magnetic particles having a surface area greater than 30 $m^2$/gm and a coverage of from about $1 \times 10^{11}$ mg/$\mu m^3$ to about $1 \times 10$ mg/$\mu m^3$, the tin oxide particles having a median diameter of less than 0.15 $\mu m$ and being present in the transparent magnetic layer in an amount of from 300 to 1200 percent by weight based on the weight of the binder.

2. The photographic element of claim 1 wherein the tin oxide particles have a median diameter less than 0.1 μm.

3. The photographic element of claim 1 wherein the tin oxide particles have a median diameter of from 0.05 to 0.1 μm.

4. The photographic element of claim 1 wherein the tin oxide particles are electrically conductive.

5. The photographic element of claim 4 wherein the tin oxide particles are present in the amount of from 1000 to 1200 percent by weight based on the weight of the binder.

6. The photographic element of claim 4 wherein the tin oxide particles are antimony doped tin oxide.

7. The photographic element of claim 4 wherein the tin oxide particles are indium doped tin oxide.

8. The photographic element of claim 1 wherein the polymeric binder is a cellulose ester, a polyurethane or a vinyl polymer.

9. The photographic element of claim 8 wherein the polymeric binder is crossed-linked.

10. The photographic element of claim 9 wherein the polymeric binder is cross-linked by a melamine, and aziridine or an isocyanate.

11. The photographic element of claim 9 wherein the polymeric binder is cross-linked with an isocyanate.

12. The photographic element of claim 11 herein the polymeric binder contains active hydrogen atoms as determined by the Zerewitinoff test.

13. The photographic element of claim 8 wherein the polymeric binder is a cellulose ester.

14. The photographic element of claim 13 wherein the cellulose ester is a cellulose acetate.

15. The photographic element of claim 14 wherein the cellulose acetate is cellulose diacetate.

16. The photographic element of claim 15 wherein the cellulose diacetate is cross-linked with a polyisocyanate.

17. The photographic element of claim 14 wherein the cellulose acetate is cellulose triacetate.

18. The photographic element of claim 8 wherein the polymeric binder is a polyurethane.

19. The photographic element of claim 8 wherein the polymeric binder is a vinyl polymer.

20. The photographic element of claim 1 wherein the tin oxide particles are nonconductive.

21. The photographic element of claim 1 wherein abrasive particles having a median diameter of 0.2 to 0.4 μm are included in the transparent magnetic recording layer.

22. The photographic element of claim 21 wherein the abrasive particles are present in an amount of from 1 to 20 weight percent based on the weight of the binder.

23. The photographic element of claim 21 wherein the abrasive particles are present in an amount of from 1 to 7 weight percent based on the weight of the binder.

24. A transparent magnetic recording layer comprising a transparent polymeric binder, ferromagnetic particles and tin oxide particles, the magnetic particles having a surface area greater than 30 m$^2$/gm and a coverage of from about $1 \times 10^{-11}$ mg/μm$^3$ to about $1 \times 10^{-10}$ mg/μm$^3$, the tin oxide particles having a median diameter of less than 0.15 μm, and being present in an amount of from 300 to 1200 percent by weight based on the weight of the binder.

25. The transparent magnetic recording layer of claim 24 wherein the tin oxide particles have a median diameter less than 0.1 μm.

26. The transparent magnetic recording layer of claim 24 wherein the tin oxide particles have a median diameter of from 0.05 to 0.1 μm.

27. The transparent magnetic recording layer of claim 24 wherein the tin oxide particles are electrically conductive.

28. The transparent magnetic recording layer of claim 27 wherein the tin oxide particles are present in the amount of from 1000 to 1200 percent by weight based on the weight of the binder.

29. The transparent magnetic recording layer of claim 27 wherein the tin oxide particles are antimony doped tin oxide.

30. The transparent magnetic recording layer of claim 27 wherein the tin oxide particles are indium doped tin oxide.

31. The transparent magnetic recording layer of claim 24 wherein the polymeric binder is a cellulose ester, a polyurethane or a vinyl polymer.

32. The transparent magnetic recording layer of claim 31 wherein the polymeric binder is crossed-linked.

33. The transparent magnetic recording layer of claim 32 wherein the polymeric is cross-linked by a melamine, and aziridine or an isocyanate.

34. The transparent magnetic recording layer of claim 32 wherein the polymeric binder is cross-linked with an isocyanate.

35. The transparent magnetic recording layer of claim 31 wherein the polymeric binder is a cellulose ester.

36. The transparent magnetic recording layer of claim 35 wherein the cellulose ester is a cellulose acetate.

37. The transparent magnetic recording layer of claim 36 wherein the cellulose acetate is cellulose diacetate.

38. The transparent magnetic recording layer of claim 37 wherein the cellulose diacetate is cross-linked with a polyisocyanate.

39. The transparent magnetic recording layer of claim 36 wherein the cellulose acetate is cellulose triacetate.

40. The transparent magnetic recording layer of claim 32 wherein the polymeric binder is a polyurethane.

41. The transparent magnetic recording layer of claim 31 wherein the polymeric binder is a vinyl polymer.

42. The transparent magnetic recording layer of claim 24 wherein the polymeric binder contains active hydrogen atoms as determined by the Zerewitinoff test.

43. The transparent magnetic recording layer of claim 24 wherein abrasive particles having a median diameter of 0.2 to 0.4 μm are included.

44. The transparent magnetic recording layer of claim 43 wherein the abrasive particles are present in an amount of 1 to 20 weight percent based on the weight of the binder.

45. The transparent magnetic recording layer of claim 44 wherein the abrasive particles are present in the amount of 1 to 7 percent.

* * * * *

IN THE UNITED STATES PATENT AND TRADEMARK OFFICE
CERTIFICATE OF CORRECTION

PATENT NO.    : 5,427,900
DATED         : June 27, 1995
INVENTOR(S)   : Robert O. James et al.

It is certified that errors appear in the above-identified patent and that said Letters Patent is hereby corrected as shown below:

Column 16, lines 65-66, "1 x $10^{11}$ mg/$\mu$m$^3$" should read --1 x $10^{-11}$ mg/$\mu$m$^3$--

Column 16, line 66, "1 x 10 mg/$\mu$m$^3$" should read --1 x $10^{-10}$ mg/$\mu$m$^3$--

Signed and Sealed this

Tenth Day of October, 1995

Attest:

BRUCE LEHMAN

*Attesting Officer*     *Commissioner of Patents and Trademarks*